(12) United States Patent
Di Luoffo et al.

(10) Patent No.: US 7,380,125 B2
(45) Date of Patent: *May 27, 2008

(54) SMART CARD DATA TRANSACTION SYSTEM AND METHODS FOR PROVIDING HIGH LEVELS OF STORAGE AND TRANSMISSION SECURITY

(75) Inventors: Vincenzo Valentino Di Luoffo, Sandy Hook, CT (US); Craig William Fellenstein, Brookfield, CT (US); Dylan Maxwell Reilly, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 954 days.

This patent is subject to a terminal disclaimer.

(21) Appl. No.: 10/443,670

(22) Filed: May 22, 2003

(65) Prior Publication Data

US 2004/0250066 A1 Dec. 9, 2004

(51) Int. Cl.
*H04L 9/00* (2006.01)

(52) U.S. Cl. ............... 713/172; 713/164; 713/167; 713/168; 713/173; 726/2; 726/3; 726/9; 380/277; 380/278; 380/281

(58) Field of Classification Search ............... 713/164, 713/168, 169, 172, 167, 173; 726/2, 3, 9; 380/277, 281
See application file for complete search history.

(56) References Cited

U.S. PATENT DOCUMENTS 5,920,730 A 7/1999 Vincent .............. 395/834

(Continued)

FOREIGN PATENT DOCUMENTS

EP 0 789 673 1/1997

(Continued)

OTHER PUBLICATIONS

XML Trust: Technology and Implementation, TechMetrix Research -SQLI 2002.*

(Continued)

*Primary Examiner*—Kim Vu
*Assistant Examiner*—Beemnet W Dada
(74) *Attorney, Agent, or Firm*—David A. Mims, Jr.; Rudolf O. Siegesmund; Gordon & Rees, LLP

(57) ABSTRACT

A smart card system is disclosed for secure transmission of post issuance data to a embedded chip using a chip relay module, a plurality of hardware security modules, a first communication system having two security layers and a second communication system having four security layers.

The first communication system may be considered a server side system and comprises a chip management system, a security server having a first hardware security module, a distribution server having a second hardware security module and a computer system connected by a network. The first communication system has a first security layer and a second security layer. The first security layer comprises mutual authentication that makes each component of the first communication system a trusted node to the others through client mutual authentication. The second security layer comprises system keys for secure communication between the hardware security modules.

The second communication system may be considered a client side system and comprises the computer system connected to the distribution server by a network, a PC/SC card reader driver, a Web browser application, and a chip relay module and is for secure communication between the distribution server and the chip of a smart card inserted in the card reader/writer. The second communication system has a third, fourth, fifth and sixth security layer.

53 Claims, 8 Drawing Sheets

U.S. PATENT DOCUMENTS

| | | | |
|---|---|---|---|
| 6,005,942 A * | 12/1999 | Chan et al. | 713/187 |
| 6,131,090 A | 10/2000 | Basso, Jr. et al. | 706/23 |
| 6,278,783 B1 | 8/2001 | Kocher et al. | 380/277 |
| 6,298,336 B1 * | 10/2001 | Davis et al. | 705/41 |
| 6,367,011 B1 * | 4/2002 | Lee et al. | 713/172 |
| 6,412,073 B1 | 6/2002 | Rangan | 713/202 |
| 6,612,486 B2 * | 9/2003 | Sato et al. | 235/375 |
| 6,981,152 B2 * | 12/2005 | Du et al. | 713/193 |
| 7,085,386 B2 * | 8/2006 | Audebert et al. | 380/281 |
| 7,103,575 B1 * | 9/2006 | Linehan | 705/64 |
| 2001/0010076 A1 | 7/2001 | Wray | |
| 2002/0147907 A1 * | 10/2002 | Ross | 713/159 |
| 2002/0162021 A1 * | 10/2002 | Audebert et al. | 713/201 |
| 2002/0162023 A1 * | 10/2002 | Audebert et al. | 713/201 |
| 2002/0174071 A1 | 11/2002 | Boudou et al. | |
| 2003/0081791 A1 | 5/2003 | Erickson et al. | |
| 2004/0148429 A1 * | 7/2004 | Audebert et al. | 709/238 |

FOREIGN PATENT DOCUMENTS

| | | |
|---|---|---|
| EP | 1 083 529 | 3/2001 |
| WO | WO 00/79411 | 12/2000 |

OTHER PUBLICATIONS

"GlobalPlatform Systems: Profiles Specification: A XML Representation," GlobalPlatform, at http://www.globalplatform.org/specifications/systems/scripspec_v1.1.0.zip, Aug. 13, 2002.

"GlobalPlatform: Card Customization Card Guide," GlobalPlatform, at http://www.globalplatform.org/specifications/systems/scripspec_v1.1.0.zip, Aug. 13, 2002.

Hallem-Baker, Phillip, "XML Key Management Specification (XKMS)," Internet Article, Jan. 30, 2001 XP002230399.

"XML Trust: Technology and Implementation," Techmetrix Research at http:// www.techmetrix.com/trendmarkers/wp/download.php?code=wpp0902-1, Sep. 2002.

Fujima & Terada, "XML Voucher: Generic Voucher Lanuage," at http://www.ietf.org/proceedings/02mar/I-D/draft-ietf-trade-voucher-lang-02.txt, Nov. 2001.

* cited by examiner

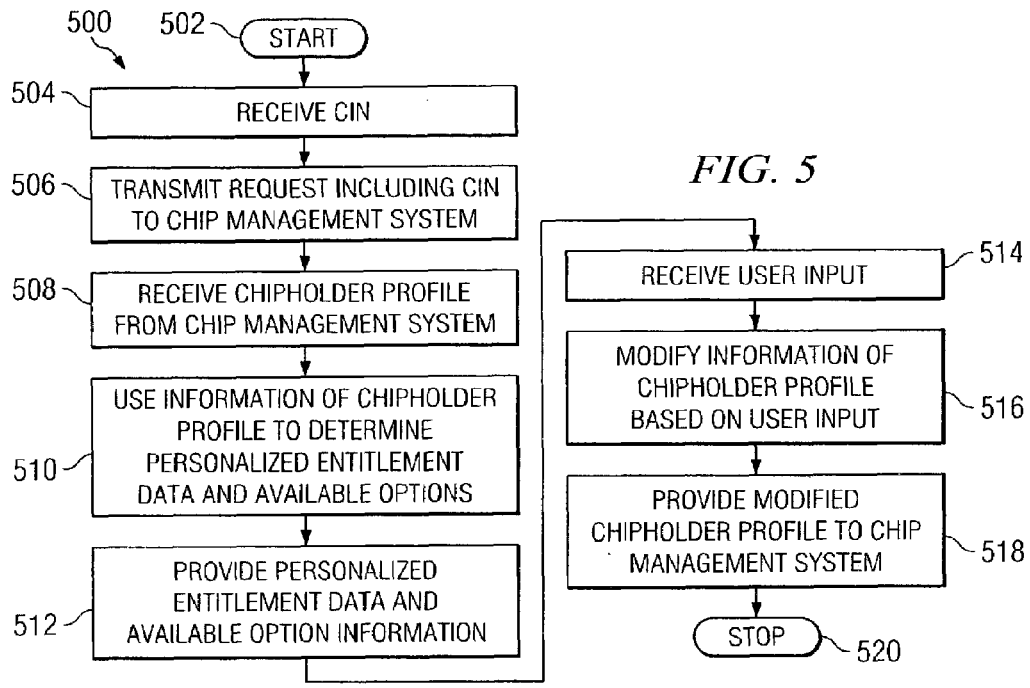
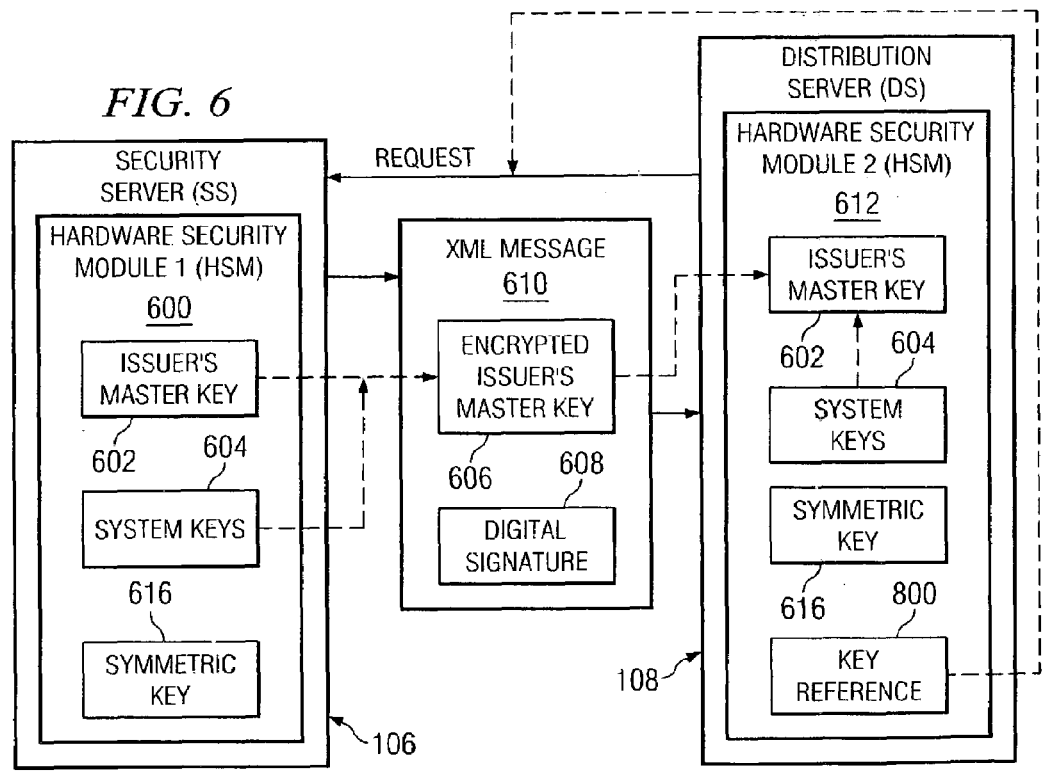

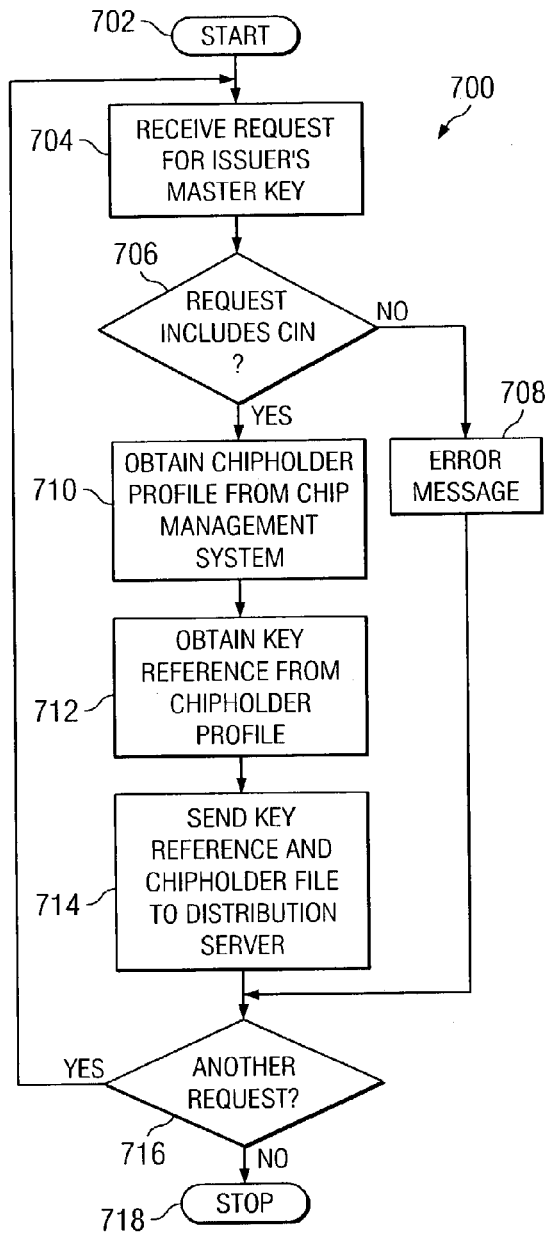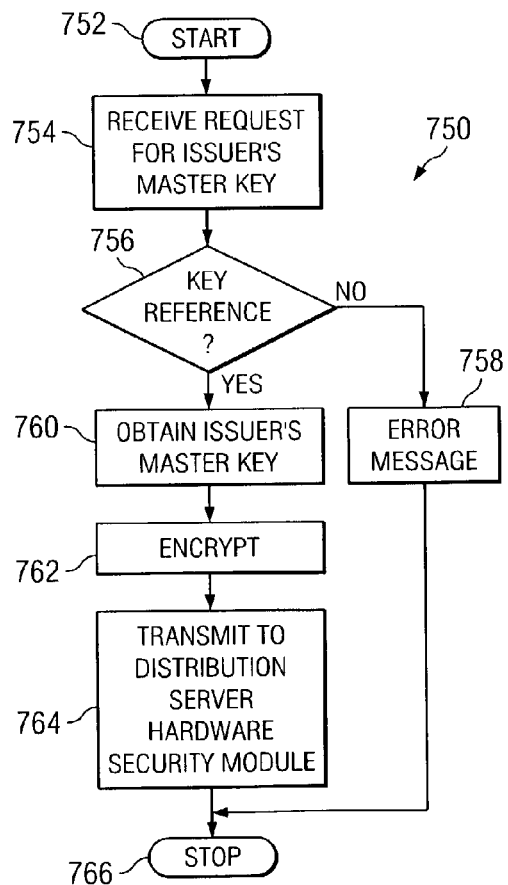

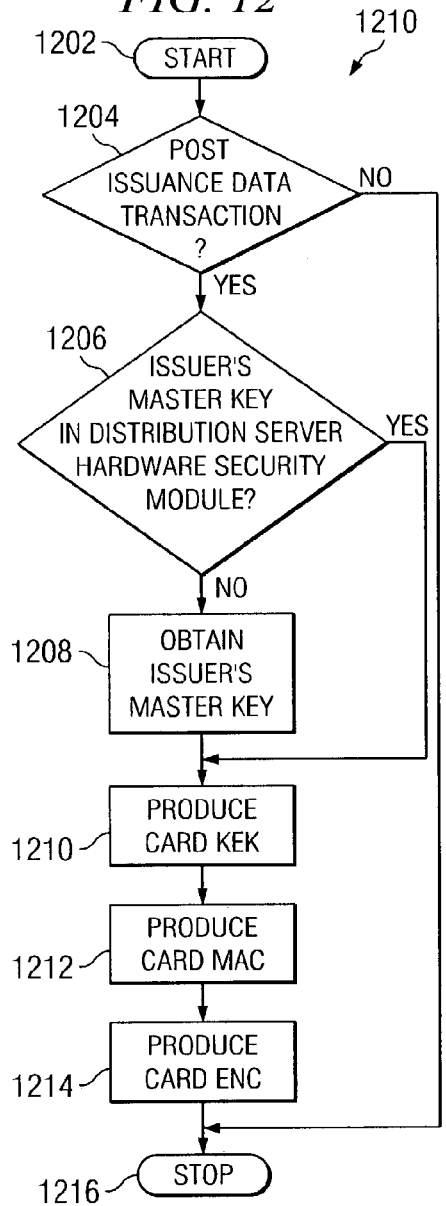
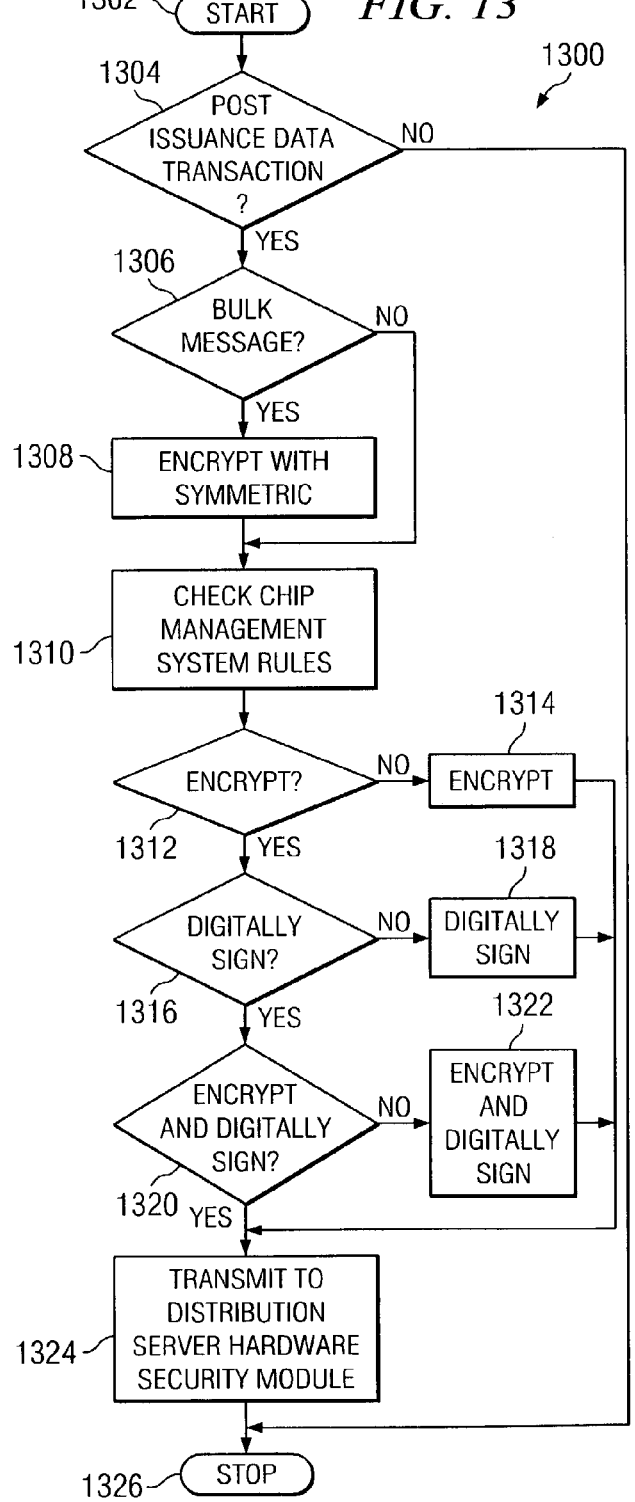

SMART CARD DATA TRANSACTION SYSTEM AND METHODS FOR PROVIDING HIGH LEVELS OF STORAGE AND TRANSMISSION SECURITY

CROSS REFERENCE TO RELATED APPLICATION

The subject matter of the present application is related to U.S. patent application Ser. No. 10/443,680, and U.S. patent application Ser. No. 10/443,669 incorporated herein by reference.

FIELD OF THE INVENTION

This invention relates generally to smart cards and, more particularly, to systems for performing secure data transactions with embedded chips in smart cards.

BACKGROUND OF THE INVENTION

Most smart cards in use today are flat, rectangular pieces of plastic resembling credit cards having electronic circuitry embedded therein. A typical smart card includes a microprocessor coupled to a memory, and the microprocessor executes instructions and performs operations on data of at least one software application program stored in the memory. The smart card provides a compact and portable computation resource for executing transactions in areas such as banking, sales, or security. Smart cards commonly appear in the form of credit cards, key-shaped tokens, and subscriber identity modules (SIMs) used in certain types of cellular telephones.

Many smart cards have a set of electrically conductive contacts arranged on an upper surface. A smart card reader/writer for communicating with such smart cards has a similarly arranged set of electrically conductive contacts. When a smart card is inserted in the smart card reader/writer, corresponding members of the two sets of contacts come into physical contact with one another. The main standards in the area of smart card and reader/writer interoperability are the International Standards Organization (ISO) 7816 standards for integrated circuit cards with contacts. The ISO 7816 standards specify interoperability at the physical, electrical, and datalink protocol levels. Other types of smart cards are "contactless." In this situation, both the smart card and the smart card reader/writer include wireless communication interfaces for communicating wirelessly (i.e., without electrical contact).

Many smart cards provide secure storage for data, including cryptographic keys used to carry out secure transactions, and are capable of performing cryptographic operations. Cryptography is, in general, a technique commonly used to protect sensitive information by encrypting a message to protect the information in the message. One method of encryption is to use a key to mathematically transform the information into an unreadable format. A key may include without limitation a code or series of characters. Only those possessing the key can decrypt the message to reveal the information.

In one likely scenario, issuers of smart cards will use one or more issuer's master keys to encrypt data for transmission to a smart card after issuance to ensure only changes authorized by the issuers are made to issued smart cards. Since an issuer's master keys may also be used to make unauthorized changes to issued smart cards, security of the issuer's master keys is essential.

U.S. Pat. No. 6,131,090 describes a method and system for providing controlled access to information stored on a smart card. The information is stored in encrypted form. A data processing center provides an access code, including a key for decrypting the information by authorized service providers. The smart card receives and verifies access codes, uses the access code to decrypt requested information, outputs the requested information, and computes a new encryption key as a function of information unique to the access session.

U.S. Pat. No. 6,481,632 discloses a smart card architecture wherein a card issuer empowers application providers to initiate approved changes to smart cards. Loading an application onto a smart card involves a card acceptance device issuing a load command. The load command includes an appended command authentication pattern used to verify the load command. The card acceptance device provides the application to the smart card. The application includes an appended application authentication pattern used to verify the application. After verification, the application is loaded into a memory of the smart card.

A need arises for a system and/or method to enable an end-user to manage the information on a chip that the end-user is entitled to manage, on any platform, in a manner such that all transactions are secure, authenticated and authorized while ensuring that the issuer's master key remains secure.

SUMMARY OF THE INVENTION

The invention that meets the need identified above is a smart card system for secure transmission of post issuance data to an embedded chip using a chip relay module, a plurality of hardware security modules, a first communication system having two security layers and a second communication system having four security layers.

The first communication system may be considered a server side system and comprises a chip management system, a security server having a first hardware security module, a distribution server having a second hardware security module and a computer system connected by a network. The first communication system has a first security layer and a second security layer. The first security layer comprises mutual authentication that makes each component of the first communication system a trusted node to the others through client mutual authentication. The second security layer comprises system keys for secure communication between the hardware security modules.

The second communication system may be considered a client side system and comprises the computer system connected to the distribution server by a network, a PC/SC card reader driver, a Web browser application, and a chip relay module. The second communication system is for secure communication between the distribution server and the chip of a smart card inserted in the card reader/writer. The second communication system has a third, fourth, fifth and sixth security layer.

The third security layer comprises secure communication between the distribution server and the web browser application program using mutual authentication.

The fourth security layer comprises session context security using a session key generated between the distribution server and the chip relay module.

The fifth security layer comprises a data marker or flag necessary for secure transmissions between the distribution server and the chip.

The sixth security layer comprises message authentication code or message authentication code encrypted messages between the distribution server and the chip.

The first communication system is a server side system that allows secure communication between the elements of the smart card system. The second communication system or client side system allows secure communication between the chip and the distribution server. The distribution server is the common element between the two communication systems and the conduit for information from one system to the other.

Operations in the first communication system use the first security layer and the second security layer. The chip management system, the distribution server, the security server and the computer system may communicate using the first security layer based on mutual client authentication. Data transmitted between the hardware security module of the security server and the hardware security module of the distribution server may be secured by the second security layer.

The second security layer uses a set of system keys that allow data to be encrypted, digitally signed, or both encrypted and digitally signed for transmission between the hardware security modules. The system keys are the system authentication key, the system encryption key and the system digital signing key. The system authentication key is used to establish mutual authentication between the trusted nodes of the server side system. The system encryption keys include a system public key and a system private key. A system symmetric key is also provided for encrypting bulk data. The system public key is used to encrypt data for transmission to another hardware security module where the data is decrypted using the system private key at the receiving hardware security module. The system symmetric key is used to encrypt bulk data prior to encryption using the system public key. The system digital signing key allows data to be transmitted while integrity protected. For a data transmission between the security server and the distribution server involving bulk data, the hardware security module located in the security server uses the system public key to wrap the system symmetric key used to encrypt the bulk data to be transmitted, and establishes a signature for transmission of the data to be transmitted to the distribution server. For a data transmission between the security server and the distribution server involving transmission of data that is not bulk data, or involving transmission of an issuer's master key, the system public key is used to encrypt the data to be transmitted.

The hardware security module at the distribution server uses the system private key and performs the signature verification and unwrapping of the transmitted data from the security server. Data is transmitted in extensible markup language.

Transmitted data includes without limitation the issuer's master key, chipholder files, and post issuance data not included in the chipholder files. The second security layer ensures that the issuer's master key is never transmitted in the clear. The distribution server's hardware security module also uses the issuer's master key to generate card keys used to communicate with the chip.

Operations in the second communication system use the third, fourth, fifth and sixth security layers.

The third security layer is established by the chip relay module that interacts with the driver of the card reader and uses browser keys to establish secure communication between the chip and the distribution server using client mutual authentication. The chip relay module is a secure applet that interacts with the browser, the operating system and the card reader driver. The browser keys may consist of signed applets. The third security layer is established after the smart card is inserted into the card reader and the smart card is authenticated by mutual authentication between the chip and the website. After authentication, the third security layer is established by the chip relay module which is downloaded to the browser application program after authentication. The third security layer allows transmission of the chip information number so that the chipholder profile corresponding to the smart card can be identified.

The chip relay module also establishes a fourth security layer comprising a session key. The chip relay module establishes a second communications link specific to a user log on session between the chip and the distribution server by generating a unique per user logon session key for communication with the distribution server. Each time a user logs on in a new session, a unique key is generated to keep track of the data interaction between the user and the distribution server. The session key is then used by the distribution server to track and authorize any and all operations performed by a user through the chip relay module.

In addition, the chip relay module further generates a fifth security layer that is a data marker or flag specifying that the chip relay module has established a secure session with the chip. Only upon reading this data marker or flag will additional secure operations such as post issuance operations be processed by the distribution server. Once the secure session is established by the chip relay module, applications can be loaded or deleted by directly transmitting Application Protocol Data Unit (APDU) messages to the chip subject to a sixth security layer.

Data is transmitted from the distribution server to the chip subject to a sixth security layer where the data is either message authentication coded or message authentication coded encrypted using a set of card keys that are generated at the distribution server's hardware security module so that the generated card keys match the card keys installed on the chip at personalization of the smart card. The authentication protocol of the sixth security layer may be initiated by APDUs that are part of GlobalPlatform® specification standards. The messages are sent in extensible markup language.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flow chart of one embodiment of a method for conducting smart card transactions;

FIG. 6 is a diagram depicting secure transmissions between the security server and the distribution server;

FIG. 7A is a flow chart of one embodiment of a method for requesting the issuer's master key by the distribution server;

FIG. 7B is a flow chart for one embodiment of a method for transmitting the issuer's master key from the security server to the distribution server;

FIG. 12 depicts one embodiment of a method for generating card keys;

FIG. 13 depicts one embodiment of a method for transmitting post issuance data from the security server to the distribution server.

DETAILED DESCRIPTION OF THE PREFERRED EMBODIMENT

Figure 1A:
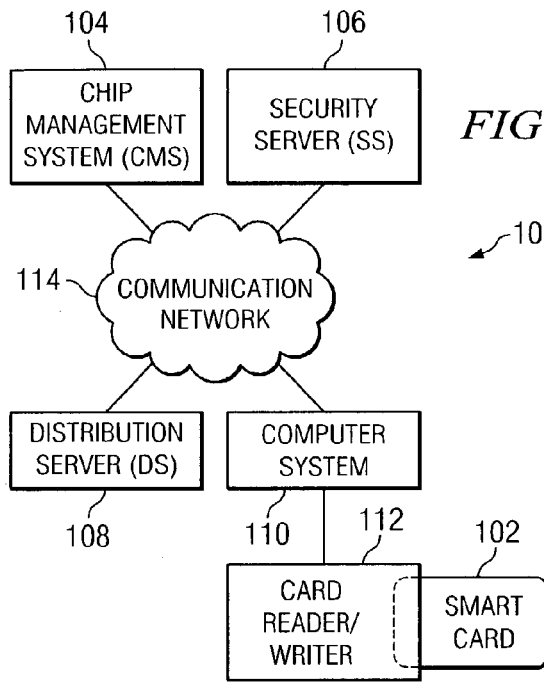
FIG. 1A is a diagram of one embodiment of a smart card system.

The following definitions shall be used herein:

"Application Protocol Data Unit" (APDU) means a message according to the standard communication protocol defined in ISO 78 16-4.

"Card keys" means a group of keys generated from an issuer's master key (IMK), an issuer identification number (IIN) and a chip information number (CIN), including without limitation an card key encryption key (CKEK), a card mac key (CMK) and a card encryption key (CEK).

"Card Key Encryption key (CKEK) means a key used to create a session key.

"Card MAC key" (CMK) means a key used to ensure the integrity of an APDU message.

"Card Encryption Key" (CEK) means a key used to encrypt an APDU message.

"Card profile" means an XML representation of a chip including all the attributes of the chip, the chip's operating system, the chip's physical characteristics, the chip's application profile and the chip's key profiles.

"Chip" means a processor and a memory contained within a smartcard wherein the processor is connected to the memory and is capable of wired or wireless communication with a card/reader writer.

"Chipholder" means a person to which a smart card has been issued by an issuer and does not include actual or potential unauthorized users.

"Chipholder profile" means information about the chip assigned to a chipholder and all of the chips' data/status including without limitation personalized entitlement data and available options of the chipholder. As used herein, the term chipholder profile shall mean a file that may contain chipholder profile information, one or more card profiles, one or more applications and/or one or more scripts.

"Chip Information Number" (CIN) means a unique number assigned to each individual chip.

"Chip Management System" (CMS) means a system that manages the lifecycle of the chip including without limitation storage and management of a card profile associated with a chipholder.

"Chip Relay Module" (CRM) means an applet that communicates with a smart card reader through a transient process having a trusted signed code that runs within a browser so that the CRM can interact between a smart card reader and a server.

"Client Card System" means a computer having an interface for communication with a smart card.

"Computer" means a machine having at least a processor, a memory and an operating system capable of interaction with a user or another computer, and includes without limitation desktop computers, notebook computers, mainframes, servers, personal digital assistants (PDAs), handheld computers, and cell phones.

"Cryptographic operations" includes without limitation encryption and decryption operations.

"Customer Reference Number" (CRN) means a unique number assigned to each chipholder.

"Decryption" means the reversal of the corresponding encryption, reversible transformation of a cryptogram by cryptographic algorithm to retrieve the original plain text data.

"Digital signature" means an asymmetric transformation of data intended to prove to the data recipient the origin and integrity of the data.

"Distribution Server" (DS) means a server that is a trusted node to the CMS that can, obtain the chipholder profile from the CMS and package information from the chipholder profile into APDUs. The DS has an Intelligent Gateway mode where the user is directly interfacing with the server or a router mode where another device such as an automatic teller machine (ATM) is performing the interaction with the user.

"Encryption" means the reversible transformation of data by cryptographic algorithm to produce a cryptogram.

"Entitlement data" is a representative of current application(s) and chip state, what applications the end-user can add/delete, and possible administrative functions such as a new application update, or a state change to the chip or application and the entitlement data is contained in the chipholder profile.

"GlobalPlatform™ specification" means guidelines allowing consistent behavior between smart cards and applications.

"Hardware Security Module" (HSM) means hardware protected cryptographic operations and key storage.

"Input device" means a device for entering information into a smartcard or a computer and shall include without limitation a keyboard, mouse, trackball, touchpad, touchpoint device, stylus pen, and touch screen.

"Issuer Identification Number" (IIN) means a unique number assigned to an issuer.

"Issuer's master key" means a private key for the issuer of a chip.

"Issuer specific data" means standard tags according to GlobalPlatform™ specification, including without limitation Issuer Identification Number (IIN) and Chip Information Number (CIN) and cryptographic keys.

"Key" means a sequence of bits that control the operation of cryptographic transformation.

"Key Encryption Key" (KEK) means a key used to encrypt another key type for key distribution purposes.

"Message Authentication Code" (MAC) means a cryptographic transformation of data that protects the sender and the recipient of the data against forgery by third parties.

"Mutual Authentication" means recognition of one element of the smart card system by another using available protocols including but not limited to Secure Sockets Layer (SSL) version 3, browser keys and signed applets.

"Output device" means a device for displaying data and shall include without limitation cathode ray tubes (CRT), liquid crystal display (LCD) and printers.

"Personal Information Number" (PIN) means a unique number assigned to each individual smartcard. "Personalization" means configuring a smart card for a chipholder including without limitation placing card cryptographic keys on the card.

"Personalized entitlement data and available option information" means chipholder information including without limitation a current smart card status report, a list of software application programs the chipholder is authorized to add and/or delete, and/or administrative functions that may be carried out regarding the chip or installed software application programs.

"Post issuance data" shall mean instructions and data for adding, modifying, or deleting data stored in a chip.

"Private key" means the secret component of an asymmetric key pair which may be used to decrypt messages that are encrypted using the corresponding public key and that may also be used to digitally sign messages for authentication purposes.

"Public key" means the public component of an asymmetric key pair which may be used to encrypt messages intended for the owner of its corresponding private key and also to verify a message digital signature to authenticate the message sender.

"Scripts" means a set of instructions for an application.

"Security server" (SS) means a server that stores the Issuer's master key.

"Server" means a local or remote back-end system supporting smart cards.

"Smart card" means a card used for personal or business transactions comprising at least a processor and a memory capable of supporting an operating system, application programs, storage of chip holder personalization data, application data and other data may be required by the issuer of the smart card.

"Smart card system" means a system comprising a chip management system, a distribution server, a security server and a computer system connected by a network.

"Symmetric cryptography" means a cryptographic technique that uses the same secret key for both the originator's and the recipient's transformation.

"System keys" means a set of cryptographic keys used to create trusted nodes for communication within a smart card system including without limitation a system authentication key, a system encryption key and a system digital signing key."

"Unauthorized user" means a person who may gain possession of a smart card but who is not intended by the issuer of the smart card to have access to the capabilities of the card created by the microprocessor coupled to a memory in the card.

FIG. 1A is a diagram of one embodiment of smart card system 100 for carrying out data transactions with smart card 102. In the embodiment of FIG. 1A, system 100 includes chip management system (CMS) 104, security server (SS) 106, distribution server (DS) 108, and computer system 110 coupled to card reader/writer 112.

As indicated in FIG. 1A, CMS 104, SS 106, DS 108, and computer system 110 are all coupled to communication network 114. Communication network 114 includes, without limitation, the public switched telephone network (PSTN) and/or the Internet. As described in detail below, computer system 110, CMS 104, SS 106, and DS 108 communicate with one another via communication network 114, and data transactions with smart card 102 are carried out via a secure communication channel established within communication network 114.

Figure 1B:
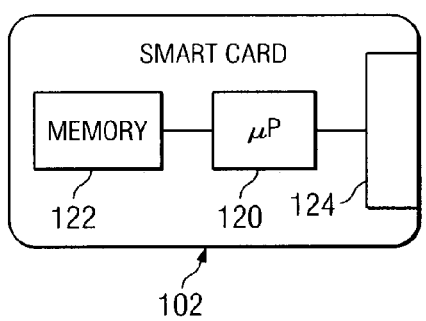
FIG. 1B is a depiction of a smart card.

FIG. 1B depicts smart card 102. Smart card 102 includes microprocessor 120 coupled to memory 122, and is capable of storing at least one software application program in the memory. Each software application program includes instructions and data. Microprocessor 120 is coupled to interface 124 which is adapted for coupling with card reader writer 112.

In the embodiment of FIG. 1B, smart card 102 is shown partially inserted into card reader/writer 112. In general, smart card 102 is capable of communicating with card reader/writer 112, and card reader/writer 112 is capable of communicating with smart card 102. More specifically, card reader/writer 112 is capable of reading data from, and writing data to, smart card 102. Alternatively, card reader/writer 112 may be a reader only such as a cellular phone. Some cellular phones have dual chip support. Global System for Mobile Communication (GSM) phones have only one SIM chip whereby the reader is the GSM phone and all applications would communicate through the wireless link of the GSM phone. Persons skilled in the art known that other cellular telephones have dual slots where one slot is for SIM and the other slot is for the smart card.

For example, smart card 102 may have a set of electrically conductive contacts (not shown) arranged on an upper surface, and card reader/writer 112 may have a similarly arranged set of electrically conductive contacts (not shown). Smart card 102 and card reader/writer 112 may, for example, comply with the International Standards Organization (ISO) 7816 standards for integrated circuit cards with contacts. When smart card 102 is inserted into card reader/writer 112, corresponding members of the two sets of contacts may come into physical contact with one another. Alternately, both card reader/writer 112 and smart card 102 may include wireless communication interfaces for communicating without electrical contact. In addition, card reader/writer 112 and smart card 102 are preferably capable of establishing and carrying out secure communications as described below.

In general, computer system 110 and card reader/writer 112 form a client card system with smart card read/write capability. Computer system 110 and card reader/writer 112 may form, for example, smart card update terminal, a point-of-sale terminal, or an automatic teller machine (ATM).

Figure 2A:
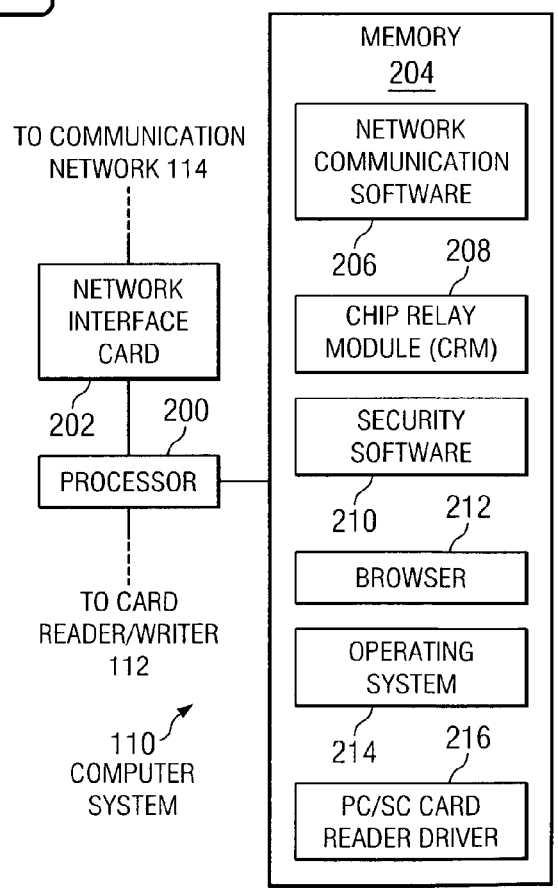
FIG. 2A is a diagram of one embodiment of the computer system of FIG. 1.

FIG. 2A is a diagram of one embodiment of computer system 110 of FIG. 1. In the embodiment of FIG. 2A, computer system 110 includes processor 200, network interface card 202, and memory 204. Memory 204 stores network communication software 206, Chip Relay Module (CRM) 208, security software 210, browser 212, operating system 214 and PC/SC card reader driver 216. Processor 200 is coupled to memory 204, and, in general, fetches and executes instructions and data of network communication software 206, CRM 208, and security software 210.

Figure 2B:
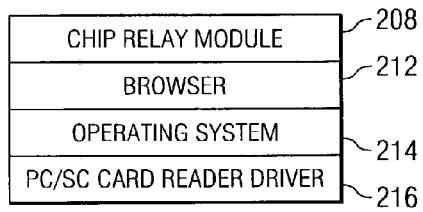
FIG. 2B is a depiction of the software stack that interacts with the CRM.

FIG. 2B depicts software stack 200 of CRM 208, browser 212, operating system 214 and PC/SC card reader driver 216. Alternatively, client stack may include software for wireless devices with no reader.

In one embodiment, communication network 114 of FIG. 1A includes the Internet, and network communication software 206 is a Web browser application program such as browser 212. Suitable Web browser application programs include Microsoft® Internet Explorer (Microsoft Corporation, Redmond, Wash.), and Netscape Navigator® (Netscape Communications Corporation, Mountain View, Calif.). In FIG. 2A, network interface card 202 is coupled between processor 200 and communication network 114 of FIG. 1A. In general, network interface card 202 is adapted for connection to communication network 114, and forms a hardware portion of a first communication system of computer system 110. A software portion of the first communication system includes network communication software 206. The software portion includes PC/SC card reader driver 216 associated with network interface card 202. In general, computer system 110 communicates with CMS 104, SS 106, and/or DS 108 (see FIG. 1) via the first communication system. CMS 104, SS 106, DS 108 and computer system 110 are trusted nodes to each other through mutual authentication in the first communication system having a first security layer in smart card system 100. As indicated in FIG. 2A, processor 200 is coupled to card reader/writer 112 (see FIG. 1A). As described above, card reader/writer 112 is capable of reading data from, and writing data to, smart card 102 (see FIG. 1A). In addition, in one embodiment described in more detail below, card reader/writer 112 also includes an input device for receiving user input and an output device for presenting data to the user. In general, CRM 208 stored in memory 204 includes instructions and data for communicating with card reader/writer 112 and/or a smart card inserted in card reader/writer 112. Processor 200 fetches and executes the instructions and data of CRM 208 to communicate with card reader/writer 112 and/or the smart card inserted in card reader/writer 112.

Card reader/writer 112 of FIG. 1A may, for example, include an interface device coupled between processor 200 and other hardware of card reader/writer 112. The interface device may form a hardware portion of a second communication system of computer system 110. A software portion of the second communication system may include CRM 208, and, for example, a driver program such as PC/SC card reader driver 216 associated with card reader/writer 112. Smart card 102 inserted into card reader/writer 112 may communicate with DS 108 via the second communication system as explained below. CRM 208 may be in memory 204 of computer system 110. In the preferred embodiment, CRM 208 is downloaded to browser 212 after smart card 102 is inserted into card reader/writer 112 and after microprocessor 120 of smart card 102 is authenticated by mutual authentication. One example of a suitable mutual authentication mechanism is a smart card having a secure access application such as an X509 certificate and a private web key on the card. The website that the chipholder is logging into is the authentication mechanism. DS 108 will request that the chipholder insert the chip into the reader and that the chipholder insert a PIN or password so that the chipholder may also be authenticated to the chip. The chips' private web key will exchange information between the chipholder and server for mutual authentication. The server will authenticate the chipholder to the website. CRM 208 establishes secure communication between microprocessor 120 of smart card 102 and DS 108 using mutual authentication to establish the third security layer in smart card system 100. The secure communication in the second communication system allows transmission of the chip information number (CIN) through the DS 108 to the first communication system.

Figure 3:
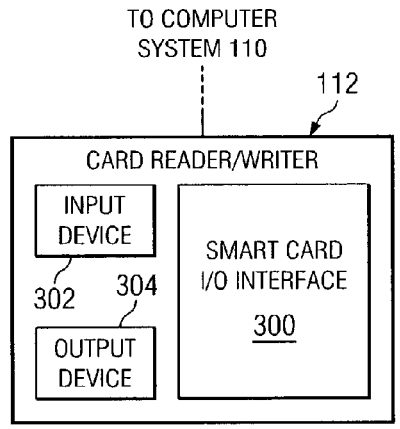
FIG. 3 is a diagram of one embodiment of the card reader/writer of FIG. 1.

FIG. 3 is a diagram of one embodiment of card reader/writer 112 of FIG. 1A. In the embodiment of FIG. 3, card reader/writer 112 includes smart card input/output (I/O) interface 300, input device 302, and output device 304. In general, smart card input/output (I/O) interface 300 is capable of reading data from, and writing data to, a smart card brought into contact with (wired), or into proximity of (wireless), smart card input/output (I/O) interface 300.

Input device 302 is adapted for receiving user input. Input device 302 includes, without limitation, a keypad. Card reader/writer 112 provides the user input to computer system 110 (see FIGS. 1A and 2A). Output device 304 is, in general, adapted for providing data to the user. Output device 304 includes, without limitation, a liquid crystal display (LCD). Card reader/writer 112 receives output data from computer system 110 (see FIGS. 1A and 2A) and presents the output data to the user via output device 304.

Figure 4:
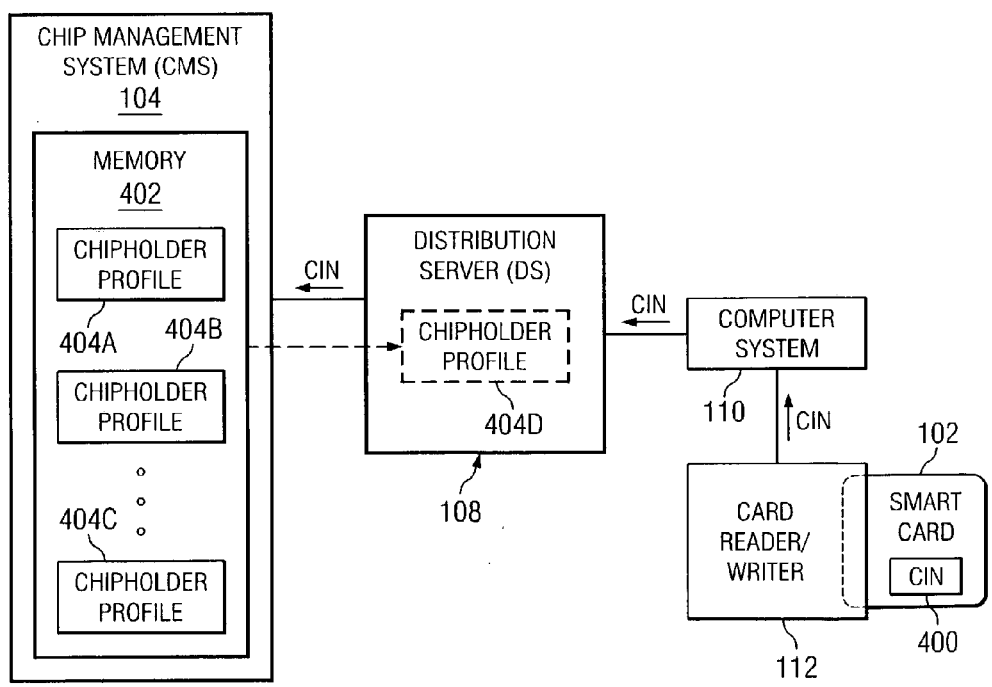
FIG. 4 is a diagram depicting an initial portion of a smart card transaction carried out in the system of FIG. 1.

FIG. 4 is a diagram depicting an initial portion of a smart card transaction carried out in system 100 of FIG. 1A. Such transactions may involve, for example, post-issuance operations such as software application program loads and/or deletions. In the embodiment of FIG. 4, DS 108 authenticates a user inserting smart card 102 into card read/writer 112. Such authentication may involve, for example, a mutual authentication and/or the user entering a personal identification number (PIN) via input device 302 of card reader/writer 112 (see FIG. 3). Persons skilled in the art recognize that a PIN may also be a password depending on the application. In GlobalPlatform™ cards, a PIN can be a Global PIN for the card and an application may support the Global PIN or the application may have its own PIN.

In the embodiment of FIG. 4, smart card 102 includes a chip identification number (CIN) 400. CIN 400 may be, for example, stored in a read only memory (ROM) of smart card 102. Following authentication of the user, CRM 208 of computer system 110 (see FIG. 2A) requests CIN 400 from smart card 102 and smart card 102 responds by providing CIN 400 to computer system 110 as indicated in FIG. 4. CRM 208 of computer system 110 provides CIN 400 to DS 108. As described in more detail below, DS 108 provides a request to CMS 104 including CIN 400.

In the embodiment of FIG. 4, CMS 104 includes memory 402 storing multiple chipholder profiles 404A, 404B, and 404C.

Each of the chipholder profiles 404 includes information associated with a different chipholder. In general, CMS 104 stores and maintains chipholder profiles 404. Each chipholder profile 404 also includes data regarding the corresponding smart card. For example, a given chipholder profile 404 would expectedly include the CIN 400 of the corresponding smart card 102, as well as information regarding software application programs stored in a memory system of the smart card, entitlement data regarding the stored applications, and other information as desired by the issuer of the smart card. In a separate process, chipholder profiles including applications, scripts and card profiles are tested at a security server such as SS 106 (see FIG. 1) to ensure that there are no patterns in the data indicating a security concern such as virus, and that an application is not a rogue application that has been placed on a card without issuer approval.

Each chipholder profile, represented in FIG. 4 by chipholder profiles 404A, 404B, and 404C, may include a card profile for one or more smart cards that have been issued to a user. Each card profile contains applications and key profiles depending on the number of applications and other information. The card profile also contains a key reference that is used to obtain the corresponding issuer's master key from the security server, if needed. A specific chipholder profile is identified by CIN 400. The CIN 400 is transmitted via the third security layer so that the corresponding chipholder profile may be identified.

In response to the request including CIN 400 from DS 108, CMS 104 provides the corresponding chipholder profile, labeled 404D, to DS 108. After receiving chipholder profile 404D corresponding to CIN 400 of smart card 102, DS 108 processes the information of chipholder profile 404D, determines personalized entitlement data and available options of the chipholder, and sends the personalized entitlement data and available option information to computer system 110. CRM 208 of computer system 110 (see FIG. 2A) processes the personalized entitlement data and available option information, thereby generating output data, and provides the output data to card reader/writer 112 for output to the user.

In response to the output conveying the personalized entitlement data and available options, the user may, for example, select a specific option. In this situation, the option is relayed to DS 108 via computer system 110, and is processed by DS 108. The option may include, without limitation, the transmitting of post-issuance data from CMS 104 to smart card 102. As the session transpires, DS 108 modifies the information of chipholder profile 404D as needed. As the end of the session, if chipholder profile 404D has been modified, DS 108 transmits updated chipholder profile 404D to CMS 104, and CMS 104 stores modified chipholder profile 404D. Chipholder profile 404D is modified by updating a stored original version of chipholder profile 404D.

FIG. 5 depicts a flow chart of one embodiment of method 500 for conducting smart card transactions (MSCT). MSCT 500 may be embodied within DS 108 (see FIGS. 1 and 4). MSCT 500 starts (502). A chip identification number (CIN) of a smart card that has been inserted in card reader/writer 112 (see FIGS. 1 and 4) is received (504). A request including the CIN is provided to CMS 104 (see FIGS. 1A and 4) having a memory containing a plurality of chipholder profiles (506).

A chipholder profile corresponding to the CIN is received from CMS 104 (see FIGS. 1A and 4) (508). Personalized entitlement data and available option information is produced (510). The personalized entitlement data and available option information is provided to computer system 110 (see FIGS. 1A and 4) (512).

User input is received from card reader/writer 112 via computer system 110 (514). The information of the chipholder profile is modified according to the user input (516). The modified chipholder profile is provided to CMS 104 (see FIGS. 1A and 4) (518) and MSCT 500 stops (520).

FIG. 6 is a diagram depicting the secure transmission of issuer's master key (IMK) 602 within smart card system 100 of FIG. 1. In the embodiment of FIG. 6, SS 106 includes first hardware security module (HSM1) 600. HSM1 600 may be, for example, a cryptographic co-processor. A suitable cryptographic co-processor is the IBM 4758 cryptographic co-processor (IBM Corporation, White Plains, N.Y.).

IMK 602 and system keys 604 are stored in HSM1 600 of SS 106. When DS 108 needs IMK 602 and does not have IMK 602, DS 108 sends a request to transmit IMK 602 to SS 106. SS 106 encrypts issuer's master key 602 using system keys 604 and/or symmetric key 616, thereby forming encrypted issuer's master key 606. SS 106 generates an extensible markup language (XML) message 610 including encrypted issuer's master key 606. HSM 600 produces digital signature 608 for XML message 610, and may add digital signature 608 to XML message 610. SS 106 transmits the complete secure XML message 610 to DS 108 via communication network 114 of FIG. 1 and the secure session, wherein the complete secure XML message 610 includes encrypted issuer's master key 606 and/or digital signature 608.

The extensible markup language (XML) is commonly used to store structured data and to pass it between computer systems such as the network hosts. The syntax of XML is similar to HTML in that it contains matching sets of tags. However, unlike HTML, XML includes provisions for an extensible set of tags. The specific tag definitions to be used by an application set are determined in advance, and are utilized by both a sender and a receiver. While XML is particularly well suited for data exchange operations, the use of XML to transmit cryptographic keys described herein is considered unique and innovative.

In the embodiment of FIG. 6, DS 108 includes second hardware security module (HSM2) 612 for performing cryptographic operations and for providing secure cryptographic key storage. HSM2 612 may be, for example, a cryptographic co-processor. A suitable cryptographic co-processor is the IBM 4758 cryptographic co-processor (IBM Corporation, White Plains, N.Y.).

Prior to reception of secure XML message 610, system keys 604 are stored in HSM2 612 of DS 108. Symmetric key 616 is also stored in HMS2 612. After sending the request to transmit IMK 602 to SS 106, DS 108 establishes a secure session with SS 106 as described above. When DS 108 receives secure XML message 610 via the secure session, HSM2 612 may first use digital signature 608 to validate secure XML message 610. Once HSM2 612 validates secure XML message 610, HSM2 612 decrypts encrypted IMK 606 using system keys 604 and stores the resulting copy of the IMK 602 in HSM2 612.

FIG. 7A is a flow chart of one embodiment of CMS IMK Program (CIP) 700 for processing a request for IMK 602. IRP 700 starts (702) and receives a request for an IMK such as IMK 602 (704). A determination is made whether a CIN is included in the request (706). If not, an error message is sent (708) and CIP 700 goes to step 716. If the CIN has been included in the request, CIP 700 obtains the chipholder profile from CMS (710). A key reference, such as key reference 800, is obtained from the chipholder profile (712). The key reference and the chipholder profile are sent to the DS (714). A determination is made whether there is another request (716). If so, CIP 700 goes to step 704. If not, CIP 700 stops (718).

FIG. 7B depicts SS IMK Program (SIP) 750. SIP 750 starts (752) and receives a request for an IMK (754). A determination is made whether there is a key reference (756). If there is no key reference, an error message is sent (758) and SIP 750 stops (766). If there is a key reference, the IMK is obtained (760). The IMK is encrypted with a system key (762). The IMK is transmitted to the HSM of the DS (764) and SIP 750 stops (766).

Referring to FIG. 1A-4, 6 and 8, SS 106 has first hardware security module (HSM1) 600 and DS 108 has second hardware security module (HSM2) 612 for the second layer of security using system keys 604 that allow data to be encrypted, digitally signed, or both encrypted and digitally signed for transmission between HSM1 600 and HSM2 612. System keys 604 include a system authentication key, a system encryption keys and a system digital signing key. The system authentication key is used to establish mutual authentication. The system encryption keys include a system public key and a system private key. The system public key is used to encrypt data for transmission to another hardware security module where the data is decrypted using the system private key at the receiving hardware security module. HSM1 and HSM2 have system symmetric key 616 used for encrypting and decrypting bulk data.

For a data transmission between SS 106 and DS 108, HSM1 600 uses a system public key to encrypt the data to be transmitted, and/or establishes a signature for transmission of the data to be transmitted to DS 108. When bulk data is transmitted, the bulk data if first encrypted using system symmetric key 616, and then wrapped using the system public key. HSM2 612 uses the system private key and performs the signature verification and unwrapping of the transmitted data from HSM1 600. Data is transmitted in extensible markup language. Transmitted data includes without limitation the issuer's master key, chipholder files, and post issuance data not included in the chipholder files. The second security layer ensures that IMK 602 is never transmitted in the clear. HSM2 612 also uses IMK 602 to generate card keys 806 used to communicate with chip 120.

It is noted that smart card issuers may require that software application program loadings be carried out in particular ways via specific security policies. Smart card 102 issuers may also mandate business rules regarding how software application programs are processed.

In the preferred embodiment, a set of rules at the chip management system makes selections at the second security layer and at the sixth security layer. The set of rules selects whether data transmitted between the chip management system, the security server and the distribution server is to be encrypted, digitally signed, or encrypted and digitally signed (second security layer). The set of rules further selects whether data transmitted between the distribution server and the chip is to be message authentication code or message authentication code encrypted (sixth security layer). An application provider or a chip issuer may mandate how the loading or deleting operation is performed by a set of security rules. An application provider or a chip issuer may mandate how an application or applications are to be processed by a set of business rules. The rules are communicated to the chip management system by each specific application issuer.

In order to securely transmit data from DS 108 to the chip, card keys 806 must be generated in HSM2 612. If IMK 602 is not available at DS 108, it must be obtained from SS 106. SS 106 is the credential management component of smart card system 100 and stores IMK 602. Transmission of IMK 602 from SS 106 to DS 108 is secured using the second security layer.

Figure 8:
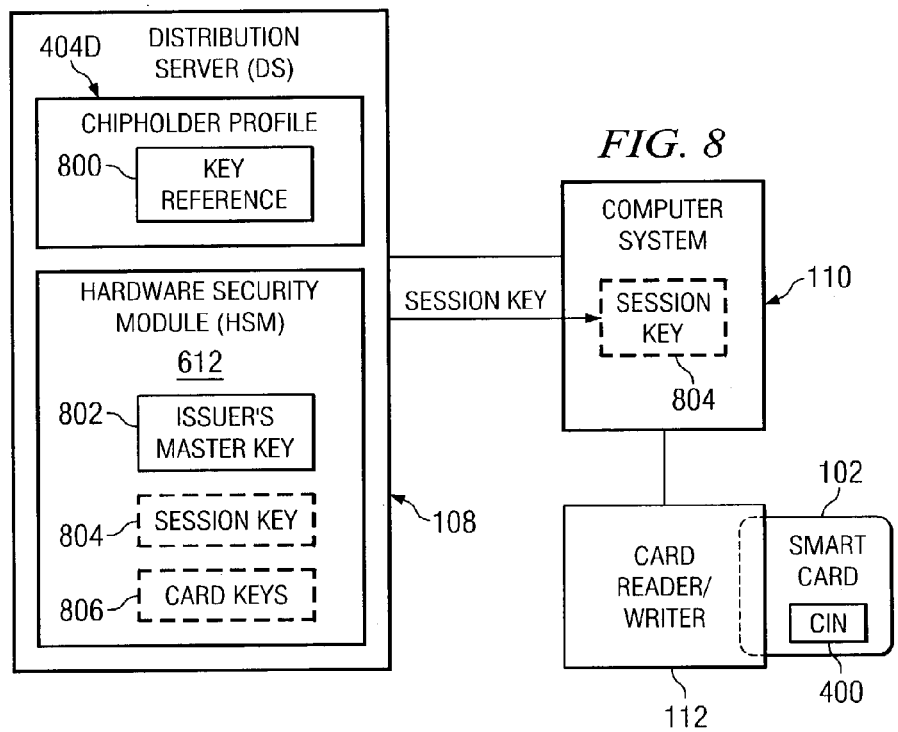
FIG. 8 is a diagram depicting the establishment of a secure communication session between the distribution server (DS) and the computer system.

FIG. 8 is a diagram depicting the establishment of a secure communication session between DS 108 and computer system 110. Using CIN 400 of smart card 102, DS 108 obtains the corresponding chipholder profile 404D as described above. Chipholder profile 404D has key reference 800 identifying the corresponding issuer's master key 802.

Issuer's master key 802 is issuer's master key 602 (see FIG. 6). If DS 108 does not initially have issuer's master key 802 identified by key reference 800, DS 108 may obtain issuer's master key 802 from SS 106 as described above with respect to FIGS. 6, 7A and 7B. HSM2 612 uses issuer's master key 802 to generate card keys 806.

As indicated in FIG. 8, HSM2 612 of DS 108 stores card keys 804. Once stored in DS 108 card keys 804 are used to encrypt and decrypt data exchanged between DS 108 and smart card 102.

Figure 9:
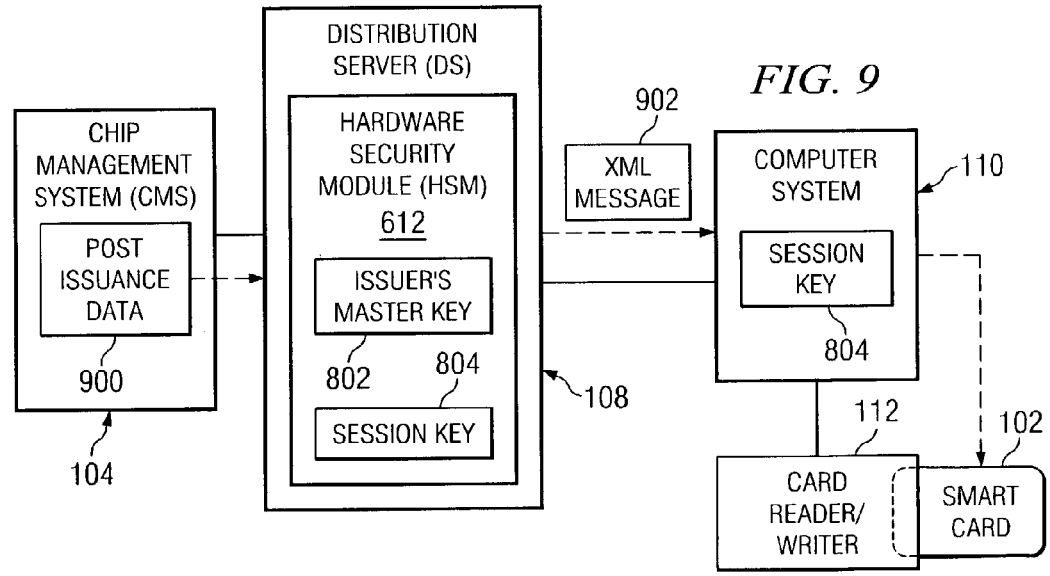
FIG. 9 is a diagram depicting the transmission of post-issuance data from the chip management system (CMS) to the smart card.

FIG. 9 is a diagram depicting the transmission of post-issuance data 900 from CMS 104 to smart card 102. In the embodiment of FIG. 9, a secure session established between DS 108 and computer system 110. The secure communication session may be established as described above with respect to FIG. 8.

In the embodiment of FIG. 9, CMS 104 stores post-issuance data 900, and transmits stored post-issuance data 900 to DS 108. For the reasons described above, post-issuance data 900 is encrypted using system keys to the DS 108. DS 108 decrypts post-issuance data 900 using system keys. DS 108 now needs issuer's master key 802 to create a secure communication session with smart card 102. If DS 108 does not initially have issuer's master key 802, DS 108 may obtain issuer's master key 802 from SS 106 as described above with respect to FIGS. 6 and 7.

Post-issuance data 900 is encrypted by CMS 104 prior to transmission to DS 108 using system keys and when applicable, the system symmetric key. When received by DS 108, encrypted post-issuance data 900 is decrypted by using system keys and when applicable, the system symmetric key. Decrypted post issuance data is provided to HSM2 612 which uses issuer's master key 802 to generate card keys. HSM2 612 uses the card keys to generate a secure XML message 902 for transmitting post issuance data 900.

CRM 208 also establishes a fourth security layer comprising session key 804. CRM 208 establishes a secured communications link specific to a user log on session between chip 120 and DS 108 by generating a session key 804 for communication with the distribution server. Session key 804 is unique for each user logon is generated to keep track of the data interaction between the user and DS 108. Session key 804 is then used by the DS 108 to track and authorize any and all operations performed by a user through CRM 208.

In addition, CRM 208 further generates a fifth security layer that is a data marker or flag specifying that the chip relay module has established a secure session with the chip. Only upon reading this data marker or flag will additional secure operations such as post issuance operations be processed by the distribution server. Once the secure session is established by CRM 208, applications can be loaded or deleted by directly transmitting APDU messages to chip 120 subject to a sixth security layer.

Data is transmitted from DS 108 to chip 120 subject to a sixth security layer where the data is either message authenticated coded or message authentication coded encrypted using a card keys 806 that are generated at HSM2 612 so that the generated card keys 806 match the card keys installed on the chip at personalization of smart card 102. The authentication protocol of the sixth security layer may be initiated by APDUs that are part of GlobalPlatform® specification standards. The messages are sent in extensible markup language.

As indicated in FIG. 9, HSM2 612 of DS 108 generates a secure XML message 902 including post-issuance data 900. The following is a programmable definition of a suitable structure of secure XML message 902:

<DistributionServer>
   <sessionID value="a_session_id"/>
   <secureSession value="true/false"/>
   <action value="action_to_perform">

```
<data>data payload</data>
<data>often APDUs including message authentication
    codes (MACs)</data>
</action>
</DistributionServer>
```

The value of the attribute "value" of the element "sessionID" is "a_session_id," the session key 804 used by DS 108, CRM 208 and smart card 102. The value of the attribute "value" of the element "secureSession" is either true or false, and represents the state of a secure session similarly established between DS 108 and smart card 102. The "action" element has an attribute "value," the value of which specifies an action to be executed by DS 108 and/or CRM 208 of computer system 110 (see FIG. 2). As indicated above, any data can reside in the "data" elements, but the data is often application protocol data units (APDUs) including message authentication codes (MACs).

HSM2 612 produces a message authentication code (MAC) for XML message 902, and adds the MAC to the message. In general, the MAC is a code or series of characters derived by applying a mathematical algorithm and a cryptographic key to post-issuance data 900. Any one of several known methods for computing MACs may be used.

Figure 10A:
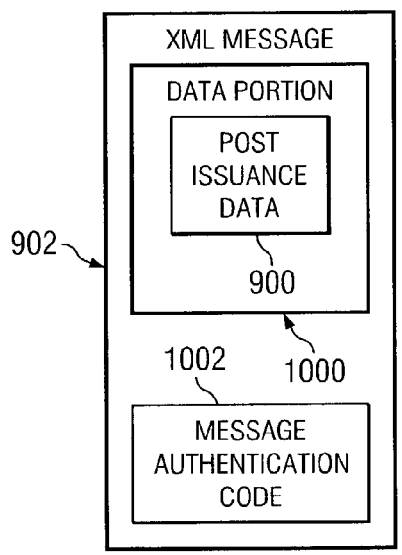
FIG. 10A is a diagram of one embodiment of the XML message of FIG. 9.

FIG. 10A is a diagram of one embodiment of XML message 902 (see FIG. 9). In the embodiment of FIG. 10, XML message 902 includes data portion 1000 and message authentication code (MAC) 1002. Data portion 1000 includes post-issuance data 900, and MAC 1002 is the MAC produced by DS 108 as described above.

Figure 10B:
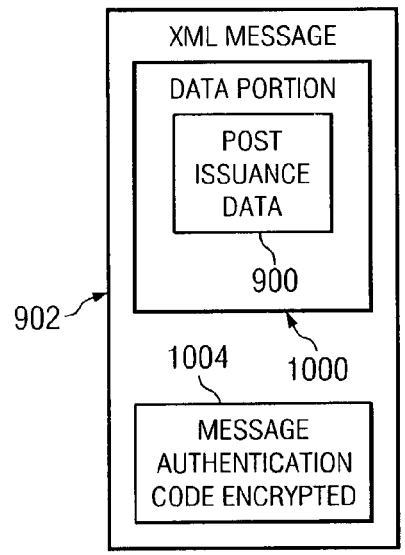
FIG. 10B is a diagram of a second embodiment of the XML message of FIG. 9.

FIG. 10B is a diagram of a second embodiment of XML message 902 (see FIG. 9). In the embodiment of FIG. 10, XML message 902 includes data portion 1000 and message authentication code (MAC) encrypted 1002. Data portion 1000 includes post-issuance data 900, and MAC encrypted 1004 is the MAC encrypted produced by DS 108 as described above.

Referring back to FIG. 9, HSM 612 encrypts XML message 902 using card keys 804, and DS 108 transmits XML message 902 to computer system 110 via the secure session. Computer system 110 receives encrypted XML message 902 from DS 108. CRM 208 and/or security software 214 of computer system 110 (see FIG. 2A) decrypts the XML message 902 to obtain post-issuance data 900 and MAC 1002. Computer system 110 uses MAC 1002 to verify both the authenticity and the integrity of post-issuance data 900.

Once the authenticity and the integrity of post-issuance data 900 are verified, computer system 110 transmits encrypted post-issuance data 900 and encrypted MAC 1002 to smart card 102 via card read/writer 112.

Smart card 102 receives and decrypts encrypted post-issuance data 900 and encrypted MAC 1002 to obtain post-issuance data 900 and MAC 1002. Smart card 102 then uses MAC 1002 to verify both the authenticity and the integrity of post-issuance data 900. Once the authenticity and the integrity of post-issuance data 900 are verified, smart card 102 processes post-issuance data 900. As used herein the term processing shall include without limitation loading a new software application program, deleting an existing software application program, or otherwise modifying stored data.

It is noted that computer system 110 and/or smart card 102 may include security software for performing cryptographic operations including without limitation encryption and decryption, and for providing secure cryptographic key storage.

Figure 11:
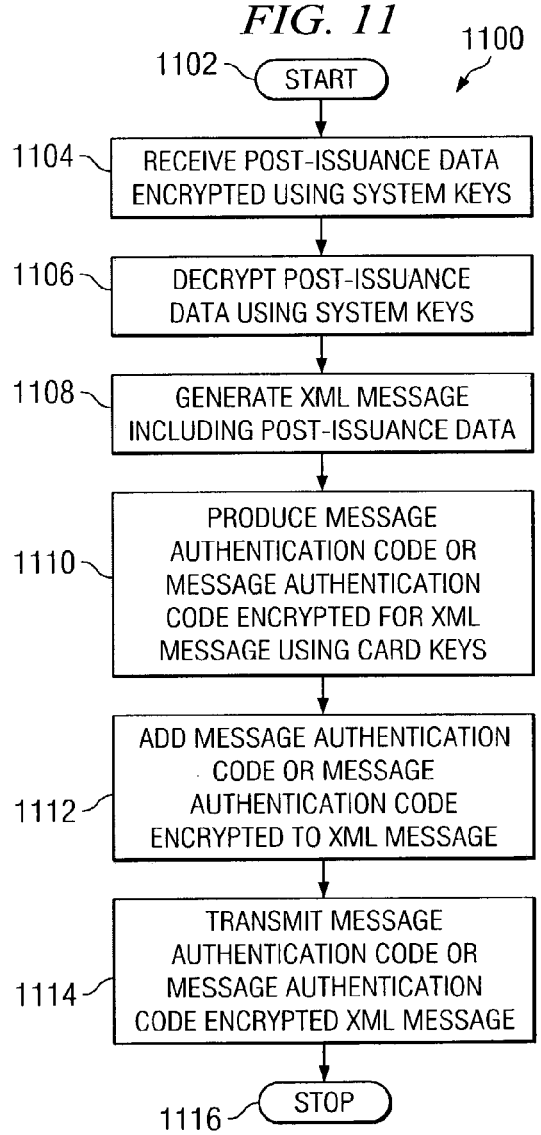
FIG. 11 depicts a flow chart of a method for secure transmission of post-issuance data from the distribution server to a smart card.

FIG. 11 depicts a flow chart of a Method for Transmitting Post-Issuance Data (MTPD) 1100 to a smart card such as smart card 102 (see FIGS. 1A and 9). MTPD 1100 may be embodied within distribution server (DS) 108 (see FIGS. 1A and 9). MTPD 100 starts and post-issuance data 900 (see FIG. 9) is received, wherein the post-issuance data is encrypted using system public key (1104). Encrypted post-issuance data is decrypted using the system private key, thereby obtaining the (unencrypted) post-issuance data (1106).

An XML message such as XML message 902 (see FIG. 9) is generated including the post-issuance data (1108). A message authentication code (MAC) or a message authentication code (MAC) encrypted for the XML message is produced using card keys (1110). The MAC or MAC encrypted is added to the XML message (1112). The MAC or MAC encrypted XML message is transmitted to a smart card via a card reader of a computer system such as computer system 110. (see FIGS. 1A and 9) (1116). MTPD 1100 stops (1116).

FIG. 12 depicts Card Key Generation Method (CKGM) 1200. CKGM 1200 starts (1202) and a determination is made as to whether a Post Issuance Data Transaction has been received (1204). If not, the CKGM 1200 stops (1216). If so, a determination is made whether the IMK is in the HSM of the DS (1206). If the IMK is not in the HSM of the DS, the IMK is obtained (1208) and DKGM 1200 proceeds to step 1210. If so, the Card KEK is produced (1210). The Card Mac Key is produced. The Card encryption key is produced (1214). CKGM 1200 stops (1216).

FIG. 13 depicts a flow chart of the post issuance data transmission method (PIDTM) 1300. PIDTM 1300 starts (1302) and a determination is made whether there is a post issuance data transaction (1304). If not, PIDTM 1300 stops (1326). If so, a determination is made whether there is a bulk message to be sent (1306). If so, the bulk message is encrypted with a symmetric key (1308) and PIDTM 1300 goes to step 1310. If not, the CMS rules are checked (1310). A determination is made as to whether the data should be encrypted using system keys (1312). If so the data is encrypted (1314) and PIDTM 1300 goes to step 1324. If not, a determination is made whether the data is to be digitally signed (1316). If so, the data is digitally signed (1318) and PIDTM 1300 goes to step 1324. If not, a determination is made whether the data is to be encrypted and digitally signed (1320). If so, the data is encrypted and digitally signed (1322) and PIDTM 1300 goes to step 1324. The data is transmitted to the DS HSM (1324). PIDTM 1300 stops (1326).

Figure 14:
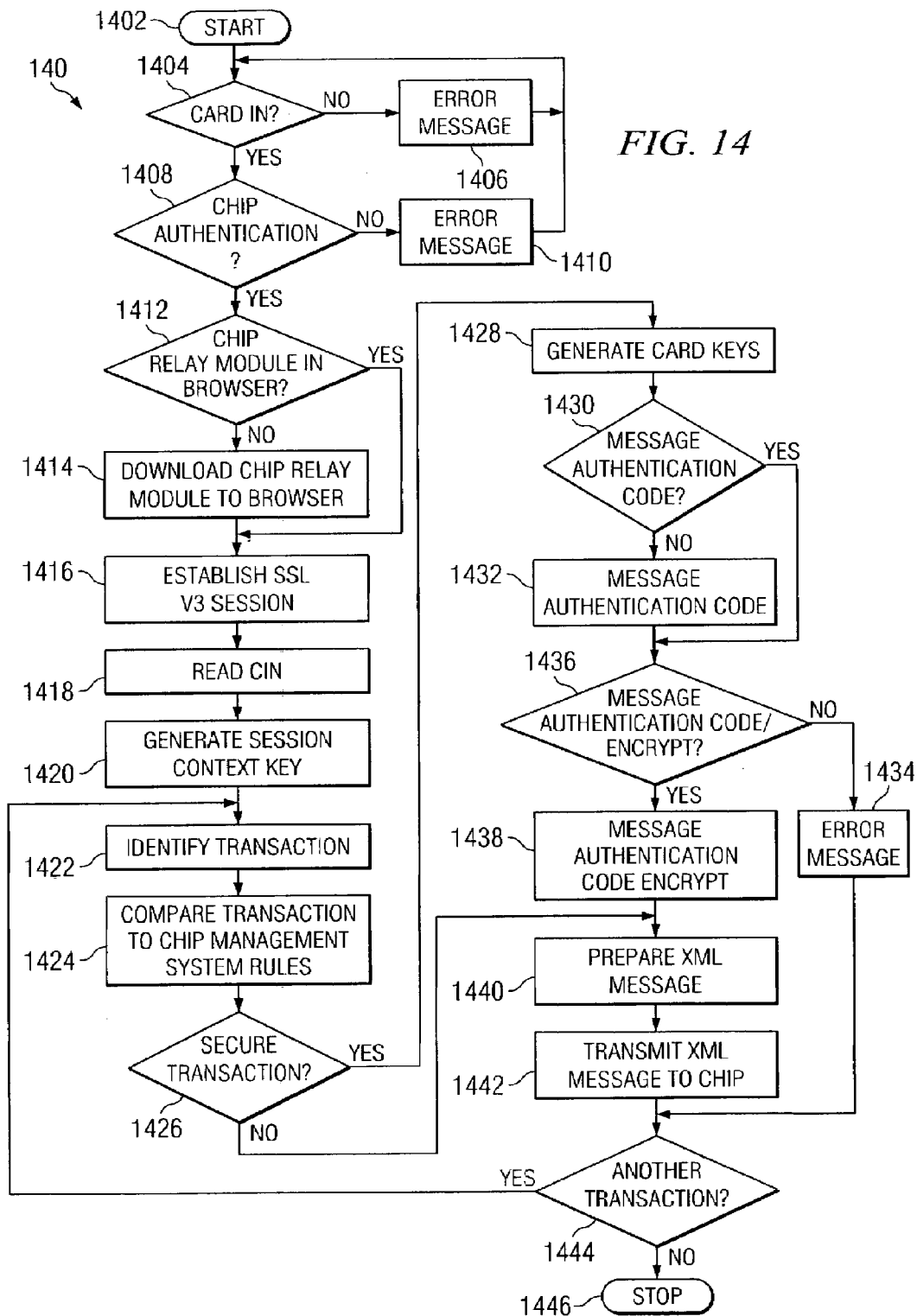
FIG. 14 depicts one embodiment of a method for secure transmission of post issuance data from the distribution server to an embedded chip of a smart card.

FIG. 14 depicts a flow chart of DS transaction process (DTP) 1400. DTP 1400 starts (1402) and a determination is made whether a card has been placed in a card reader (1404). If not, an error message is sent (1406) and DTP 1400 returns to step 1404. If so, a determination is made as to whether the chip has been authenticated by the browser (1408). If not, an error message is sent and DTP 1400 goes to step 1404. If so, a determination is made whether the CRM is in the browser (1412). If not, the CRM is downloaded to the browser (1414). An SSL V3 session is established (1416). The CIN is read (1418). A session context key is generated (1420). The type of transaction is identified (1422). The type of transaction is compared to the CMS rules (1424). A determination is made whether a secure transaction is required by the CMS rules (1426). If not, DTP 1400 goes to step 1440. If so, the card keys are generated 1428. A determination is made whether the message is to be MAC (1430). If so, the MAC is generated using the card keys (1432). If not, a determination is made whether the message is to be MAC encrypted (1436). If not, an error message is generated (1434) and DTP 1400 goes to step 1444. If so, MAC encrypted is generated using the system keys (1438). The XML message is prepared with either the MAC or MAC encrypted code (1440). The XML message is transmitted to the chip (1442). A determination is made whether there is to be another transaction (1444). If so, DTP 1400 goes to step 1422. If not, DTP 1400 stops (1446).

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. An apparatus for secure transmission of a post issuance data from a distribution server to a smart card comprising:
    a smart card inserted in a card reader;
    a chip embedded in the smart card and electronically connected to the card reader;
    a computer connected to the card reader and to the distribution server by a network;
    a chip relay module in a browser in the memory of the computer;
    wherein the chip relay module establishes a secure session with the distribution server;
    wherein the post issuance data is transmitted from the distribution server to the smart card in an XML message that has been provided with a code derived from an issuer's master key;
    wherein the issuer's master key is obtained from a first hardware security module on a security server by a second hardware security module on the distribution server for the purpose of deriving the code;
    wherein the issuer's master key is identified using a reference in a chipholder profile; and,
    wherein when identified the issuer's master key is transmitted securely from the first hardware security module to the second hardware security module.

2. The apparatus of claim 1 wherein the code is a message authentication code.

3. The apparatus of claim 1 wherein the code is a message authentication code encrypted.

4. The apparatus of claim 2 wherein the message authentication code is derived from a first card key.

5. The apparatus of claim 4 wherein the first card key is derived from the issuer's master key.

6. The apparatus of claim 3 wherein the message authentication code encrypted is derived from a second card key.

7. The apparatus of claim 6 wherein the second card key is derived from the issuer's master key.

8. The apparatus of claim 1 wherein the issuer's master key is obtained from a first hardware security module in a security server and transmitted to a second hardware security module in the distribution server.

9. The apparatus of claim 8 wherein the issuer's master key is encrypted using a system public key.

10. The apparatus of claim 9 wherein the issuer's master key is decrypted in the second hardware security module using a system private key.

11. The apparatus of claim 1 wherein the chip relay module establishes a secure communication between the chip and the distribution server by a second mutual authentication.

12. The apparatus of claim 1 wherein the chip relay module establishes a session context security using a session key.

13. The apparatus of claim 1 wherein a data marker is a precondition for a secure transmission between the distribution server and the chip.

14. The apparatus of claim 1 wherein a flag is a precondition for a secure transmission between the distribution server and the chip.

15. The apparatus of claim 1 further comprising a secure communication between the distribution server and the browser using a first mutual authentication.

16. The apparatus of claim 1 further comprising a chip management system connected to the network.

17. The apparatus of claim 16 wherein the chip management system further comprises a plurality of chipholder files.

18. The apparatus of claim 17 wherein the chipholder files further comprise a card file.

19. The apparatus of claim 18 wherein the card file further comprises a reference key.

20. The apparatus of claim 19 wherein the reference key is used to obtain the issuer's master key.

21. The apparatus of claim 16 wherein the chip management system and the distribution server share a means for a first mutual authentication.

22. The apparatus of claim 1 wherein the post issuance data is encrypted for transmission from a security server to the distribution server.

23. The apparatus of claim 1 wherein the post issuance data is digitally signed for transmission from a security server to the distribution server.

24. The apparatus of claim 1 wherein the post issuance data is encrypted and digitally signed for transmission from a security server to the distribution server.

25. The apparatus of claim 1 wherein the post issuance data is bulk data and the bulk data is encrypted using a system symmetric key.

26. The apparatus of claim 1 wherein the post issuance data is encrypted using a system symmetric key and is further encrypted using a system public key.

27. A method for secure transmission of a post issuance data between a distribution server and a chip comprising:
    inserting a smart card having a chip into a card reader connected to a computer and a network; and
    responsive to authentication of the chip at the distribution server, using a chip relay module to establish a secure communication between the chip and the distribution server;
    wherein the post issuance data is transmitted from the distribution server to the chip in an XML message provided with a code derived from an issuer's master key;
    wherein the issuer's master key is obtained from a first hardware security module on a security server by a second hardware security module on the distribution server for the purpose of deriving the code;
    wherein the issuer's master key is identified using a reference in a chipholder profile; and,
    wherein when identified the issuer's master key is transmitted securely from the first hardware security module to the second hardware security module.

28. The method of claim 27 further comprising:
generating a set of card keys at a hardware security module of the distribution server;
using the card keys to encrypt an XML message containing the post issuance data; and
transmitting the post issuance data from the distribution server to the chip.

29. A method for secure transmission of a post issuance data between a distribution server and a chip comprising:
configuring a first communication system having a distribution server, a security server, a chip management system and a first security layer;
configuring a second communication system having the distribution server and a client card system having a chip relay module;
using the chip relay module to establish a third security layer in the second communication system;
using a chip identification number to obtain the post issuance data from the chip management system;
using a card key to encrypt the post issuance data for transmission from the distribution server to the chip; and
wherein the card key is generated from an issuer's master key obtained from the security server;
wherein the issuer's master key is obtained from a first hardware security module on the security server by a second hardware security module on the distribution server for the purpose of deriving the card key;
wherein when the issuer's master key has been obtained by use of the reference, the issuer's master key is transmitted securely from the first hardware security module to the second hardware security module.

30. The method of claim 29 further comprising:
configuring a second security layer in the first communication system.

31. The method of claim 29 further comprising:
configuring a fourth security layer in the second communication system.

32. The method of claim 29 further comprising:
configuring a fifth security layer in the second communication system.

33. The method of claim 29 further comprising:
configuring a sixth security layer in the second communication system.

34. The method of claim 30 further comprising:
using a first system key to establish the second security layer.

35. The method of claim 31 further comprising:
using a session key to establish the fourth security layer.

36. The method of claim 32 further comprising:
using a data marker or flag to establish a fifth security layer.

37. The method of claim 33 further comprising:
using a MAC to establish a sixth security layer.

38. The method of claim 33 further comprising:
using a MAC encrypted to establish a sixth security layer.

39. The method of claim 34 further comprising:
using a second system key to encrypt the post issuance data.

40. The method of claim 34 further comprising:
using a second system key to wrap a post issuance data that has been encrypted using a symmetric key.

41. An apparatus for secure transmission of a post issuance data from a distribution server to a smart card comprising:
a first communication system connecting a security server, a distribution server and a chip management system;
a second communication system connecting the distribution server and a client card system having a card reader;
a chip embedded in the smart card and electronically connected to the card reader;
wherein the post issuance data is transmitted from the distribution server to the chip encrypted by a card key;
wherein the post issuance data is transmitted from the distribution server to the smart card in an XML message provided with a code derived from an issuer's master key by a second hardware security module;
wherein the issuer's master key is obtained from a first hardware security module on a security server by a second hardware security module on the distribution server for the purpose of deriving the code;
wherein the issuer's master key is identified using a reference in a chipholder profile; and,
wherein when identified the issuer's master key is transmitted securely from the first hardware security module to the second hardware security module.

42. The apparatus of claim 1 wherein the chip has a set of installed card keys.

43. The apparatus of claim 1 wherein in order to securely transmit the post issuance data from the distribution server to the chip, the post issuance data must be message authentication coded.

44. The apparatus of claim 43 wherein in order to message authentication code the post issuance data, a set of card keys corresponding to a set of card keys in the chip is generated using an issuer's master key.

45. The apparatus of claim 44 wherein in order to generate the set of card keys, the issuer's master key is requested from the security server.

46. The apparatus of claim 45 wherein responsive to a request for the issuer's master key by the distribution server, a first hardware security module in the security server encrypts the issuer's master key using a system encryption key, and transmits the encrypted issuer's master key to the distribution server.

47. The apparatus of claim 45 wherein responsive to the receipt of the encrypted issuer's master key by the distribution server, a second hardware security module in the distribution server, decrypts the issuer's master key.

48. The apparatus of claim 47 wherein responsive to decryption of the issuer's master key in the second hardware security module, the hardware security module uses the issuer's master key to generate a set of card keys.

49. The apparatus of claim 41 wherein post issuance data is encrypted for transmission from the security server to the distribution server using a system public key.

50. The apparatus of claim 41 wherein post issuance data is encrypted for transmission from the distribution server to the chip using a set of card keys.

51. The apparatus of claim 41 wherein, when post issuance data is bulk data, the bulk data is first encrypted using a system symmetric key and then encrypted using a system public key.

52. The apparatus of claim 41 wherein post issuance that has been encrypted is decrypted at the distribution server using a system private key.

53. The apparatus of claim 41 wherein post issuance data that is bulk data is decrypted at the distribution server using a system private key and a system symmetric key.

* * * * *